(12) United States Patent
Ojima et al.

(10) Patent No.: US 7,776,481 B2
(45) Date of Patent: Aug. 17, 2010

(54) FUEL CELL SYSTEM AND METHOD OF CONTROLLING ELECTRICAL ENERGY DISCHARGED IN THE FUEL CELL SYSTEM

(75) Inventors: Kuniaki Ojima, Yuki (JP); Hibiki Saeki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 722 days.

(21) Appl. No.: 11/517,048

(22) Filed: Sep. 7, 2006

(65) Prior Publication Data

US 2007/0054166 A1 Mar. 8, 2007

(30) Foreign Application Priority Data

Sep. 7, 2005 (JP) .............................. 2005-258914

(51) Int. Cl.
*H01M 8/04* (2006.01)

(52) U.S. Cl. ...................................... 429/429; 429/432

(58) Field of Classification Search ............. 429/12–46, 429/23
See application file for complete search history.

(56) References Cited

U.S. PATENT DOCUMENTS

2004/0101724 A1* 5/2004 Imamura et al. ............... 429/22

FOREIGN PATENT DOCUMENTS

JP 2004-253220 9/2004

* cited by examiner

*Primary Examiner*—Basia Ridley
*Assistant Examiner*—Jonathan G Leong
(74) *Attorney, Agent, or Firm*—Lahive & Cockfield, LLP; Anthony A. Laurentano, Esq.

(57) ABSTRACT

When a control device detects a request for stopping power generation of a fuel cell, electrical energy discharged from the fuel cell is supplied to an energy storage and other electrical devices such as an air compressor. At this time, electrical energy is supplied preferentially to the other electrical devices. Accordingly, discharge/charge losses in the energy storage can be reduced, compared to a technique in which an energy storage is charged preferentially at the time of stopping power generation of a fuel cell.

8 Claims, 9 Drawing Sheets

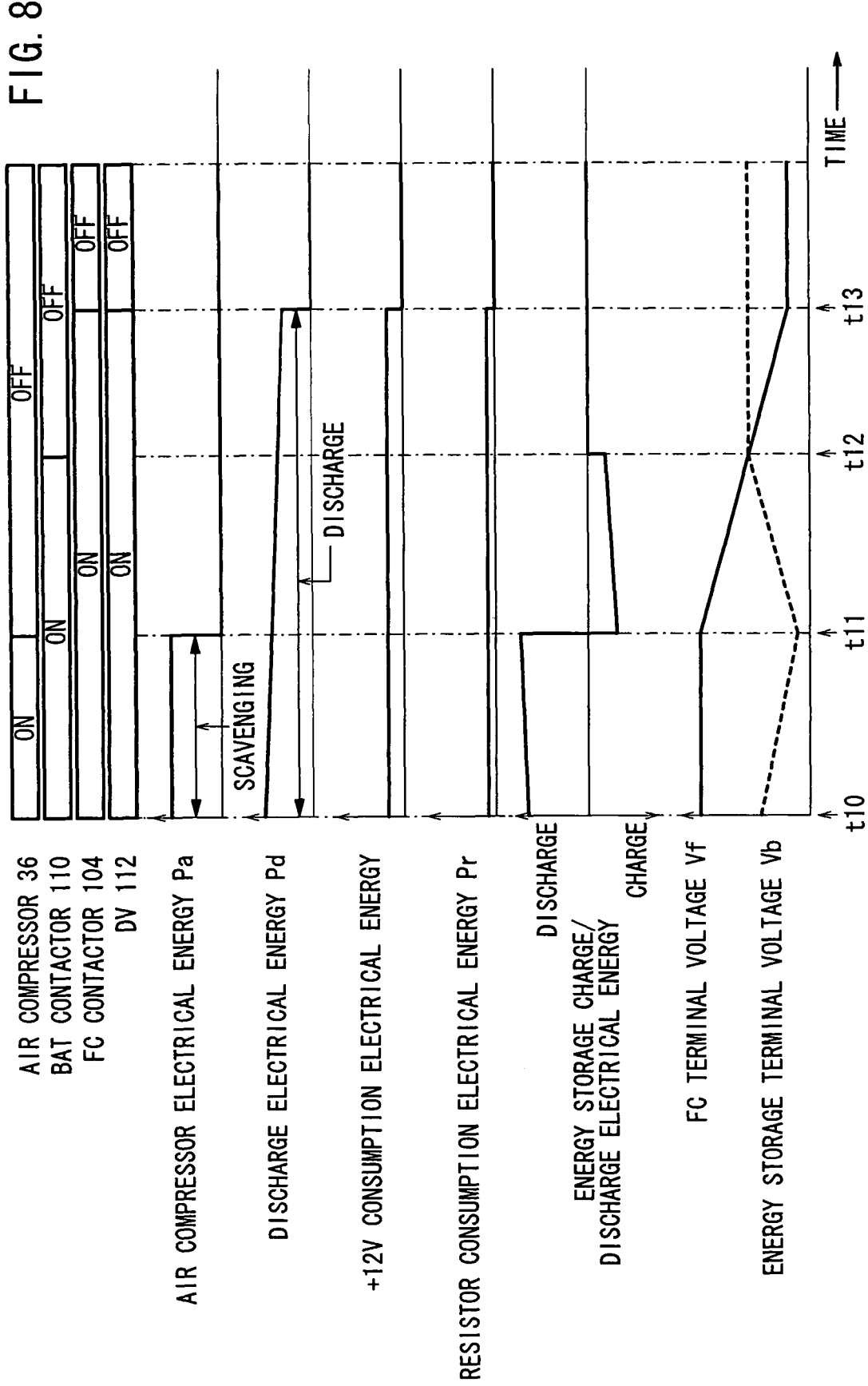

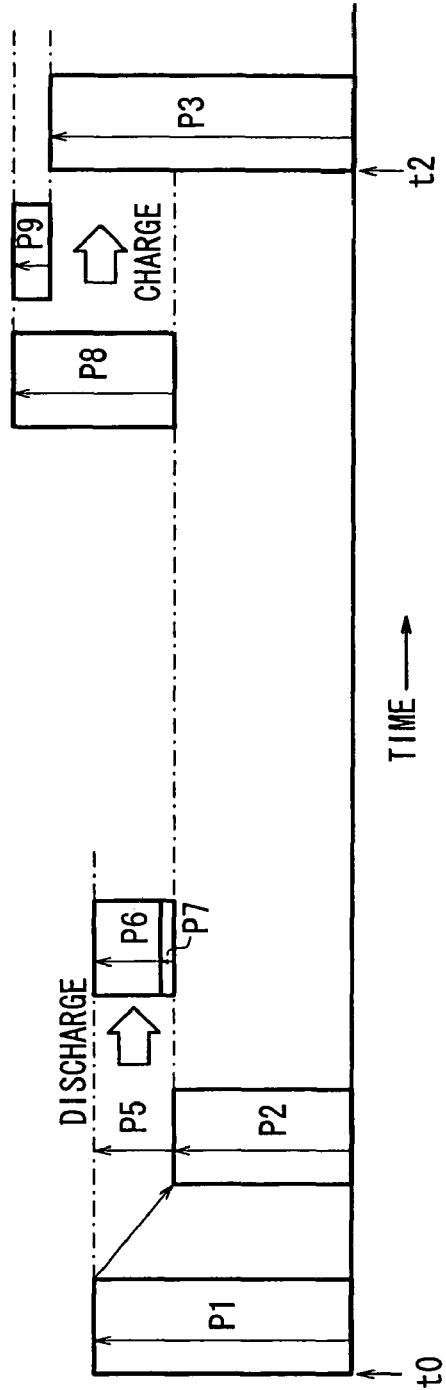
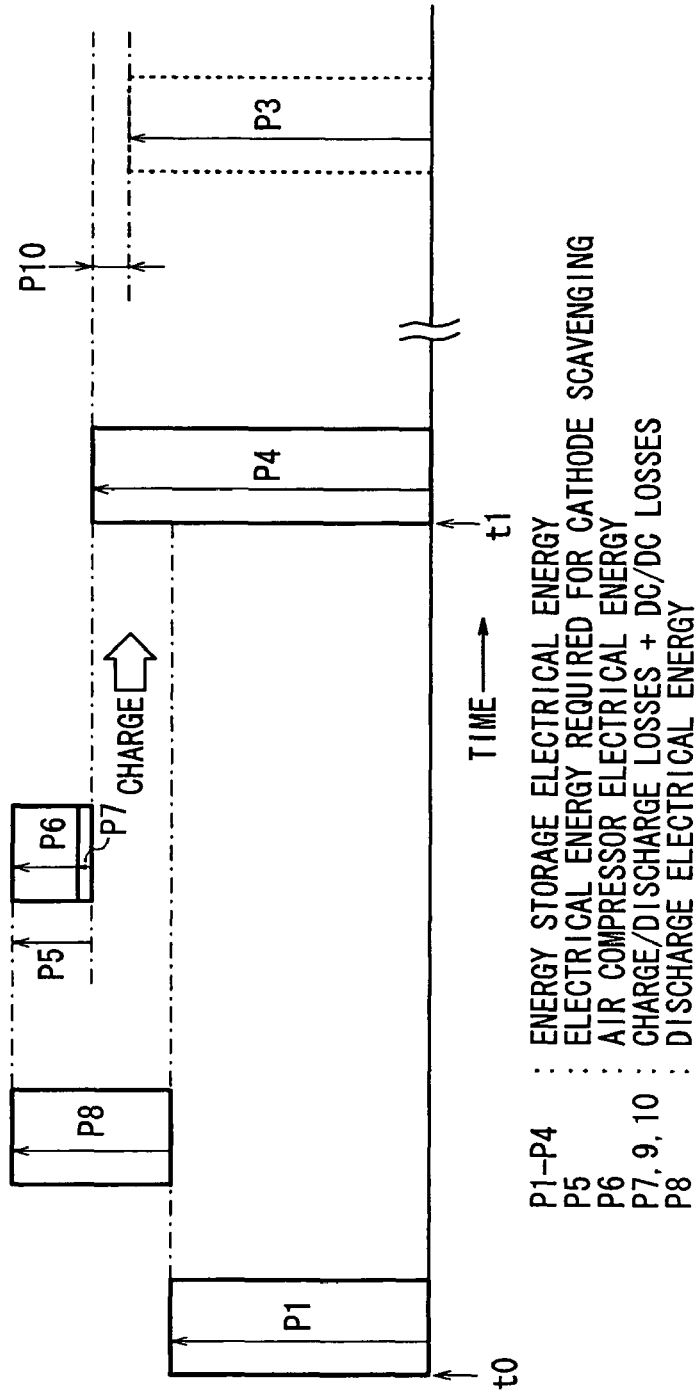
FIG. 9A PRIOR ART
FIG. 9B
P1–P4 : ENERGY STORAGE ELECTRICAL ENERGY
P5 : ELECTRICAL ENERGY REQUIRED FOR CATHODE SCAVENGING
P6 : AIR COMPRESSOR ELECTRICAL ENERGY
P7, 9, 10 : CHARGE/DISCHARGE LOSSES + DC/DC LOSSES
P8 : DISCHARGE ELECTRICAL ENERGY

FUEL CELL SYSTEM AND METHOD OF CONTROLLING ELECTRICAL ENERGY DISCHARGED IN THE FUEL CELL SYSTEM

BACKGROUND OF THE INVENTION

1. Field of the Invention

The present invention relates to a fuel cell system in which electrical energy of a fuel cell is discharged when power generation in the fuel cell system is stopped, and relates to a method of controlling discharge electrical energy in the fuel cell system.

2. Description of the Related Art

For example, a polymer electrolyte fuel cell employs a membrane electrode assembly which includes an anode (fuel electrode), a cathode (air electrode), and a polymer electrolyte membrane interposed between the electrodes. The electrolyte membrane is an ion exchange membrane. The membrane electrode assembly is sandwiched between a pair of separators. A fuel gas flow field is formed between the anode and one of the separators, and an oxygen-containing gas flow field is formed between the cathode and the other of the separators. In use, normally, a predetermined numbers of the membrane electrode assemblies and separators are stacked together to form a fuel cell stack.

In the fuel cell, a fuel gas such as a hydrogen-containing gas is supplied to the fuel gas flow field. The fuel gas flows through the fuel gas flow field along the anode. The catalyst of the anode induces a chemical reaction of the fuel gas to split the hydrogen molecule into hydrogen ions and electrons. The hydrogen ions move toward the cathode through the suitably humidified electrolyte membrane, and the electrons flow through an external circuit to the cathode, creating DC electrical energy. Further, in the fuel cell, an oxygen-containing gas such as the air is supplied to the oxygen-containing gas flow field, and the oxygen-containing gas flows along the cathode for reaction. At the cathode, hydrogen ions from the anode combine with the electrons and oxygen to produce water. If water at the cathode becomes excessive, water clogging may occur. Thus, in the fuel cell system, in order to eliminate water at the cathode, a technique of the scavenging process for the cathode (hereinafter simply referred to as the "cathode scavenging process" or the "scavenging process") is performed. In the scavenging process, the oxygen-containing gas is continuously supplied to the cathode when the supply of the fuel gas to the fuel cell is stopped.

In the case where the fuel cell system is applied to a vehicle, according to one proposal, an energy storage (secondary battery) and the fuel cell are mounted in the vehicle in parallel for driving a motor. The technique is adopted, e.g., for achieving the desired responsiveness in the fuel cell system when the fuel cell system is operated variably in accordance with the driving power, for supplying electrical energy to auxiliary devices such as an air compressor of the fuel cell system at the time of starting operation of the fuel cell, and for charging the energy storage using regeneration energy of the motor at the time of deceleration of the vehicle to use the energy for assistance of next acceleration, thereby achieving improvement in the efficiency of the fuel cell vehicle.

When the fuel cell system needs to be stopped, in order to avoid corrosion of the fuel cell components or the like, the process of discharging electrical energy from the fuel cell is required for eliminating the voltage between the electrodes of the fuel cell. In a proposed technique, the discharged energy is utilized for charging an energy storage (see Japanese Laid-Open Patent Publication No. 2004-253220).

In the technique, the fuel cell and the energy storage are connected through a DC/DC converter. After the supply of reactant gases to the fuel cell is stopped, the reactant gases remaining in the fuel cell is used for charging the energy storage through the DC/DC converter. Then, if the voltage of the fuel cell exceeds the voltage of the energy storage, the DC/DC converter is operated in a step down mode. When the voltage of the fuel cell becomes the voltage of the energy storage or less, the DC/DC converter is operated in a step up mode.

However, in practice, at the time of discharging electrical energy from the fuel cell, components (electrical devices other than the energy storage) such as an electrical control unit (ECU), contactors, the DC/DC converter, and a downverter (down converter) need to be in operation. As in the case of the technique disclosed in Japanese Laid-Open Patent Publication No. 2004-253220, if all the electrical energy discharged from the fuel cell is charged in the energy storage, the other electrical devices temporarily obtain electrical energy from a low voltage battery of +12[V]. The temporal electrical energy needs to be provided to the low voltage battery by power generation of the fuel cell, or supplied from the energy storage to the low voltage battery, before or after the discharge process, or at the time of the next operation of the fuel cell. At this time, charge/discharge losses in the energy storage, and switching losses in the converters such as the DC/DC converter and the downverter occur disadvantageously.

The problem is shown schematically in a time chart of FIG. 9A. At the time t0, the supply of the fuel gas to the fuel cell is stopped. From this time t0, the cathode scavenging process is performed by driving the air compressor using electrical energy discharged from the energy storage. Thus, the electrical energy stored in the energy storage is decreased from the initial electrical energy P1 to the electrical energy P2 by energy consumption of the electrical energy P5 required for the cathode scavenging process (P1=P5+P2). At this time, the discharge losses in the energy storage and DC/DC converter losses P7 occur for the electrical energy P6 required for the air compressor to actually perform the cathode scavenging process (P5=P6+P7).

After the cathode scavenging process is finished, the electrical energy P8 discharged from the fuel cell in the discharge process is used for charging the energy storage through the DC/DC converter. By the charge, electrical energy in the energy storage is restored from P2 to P3 (P3=P2+P8−P9) at the time t2. However, at the time of the discharge process (charge process for the energy storage), charge losses in the energy storage and DC/DC converter losses P9 occur. At the time of the charging process, if the voltage of the fuel cell becomes lower than the voltage of the energy storage, the DC/DC converter is operated in the step up mode.

As described above, in the conventional discharge process, the charge/discharge losses due to the scavenging process at the time of stopping the supply of the fuel gas, and the charge/discharge losses due to the discharge process of the energy storage after the scavenging process occur disadvantageously. Further, the circuit scale for operating the DC/DC converter in the step up mode is large disadvantageously.

SUMMARY OF THE INVENTION

The present invention has been made taking the problems into consideration, and an object of the present invention is to provide a fuel cell system and a method of controlling discharge electrical energy in a fuel cell system in which, after the supply of a fuel gas in the fuel cell system is stopped, electrical energy is utilized efficiently in the discharge process for the fuel cell.

Further, another object of the present invention is to provide a fuel cell system and a method of controlling discharge electrical energy in a fuel cell system in which the scale of a DC/DC converter connecting a fuel cell and an energy storage is reduced.

According to an aspect of the present invention, a fuel cell system comprises a fuel cell operated for power generation by reaction of reactant gases supplied to the fuel cell, and an energy storage for assisting the output of the fuel cell. The energy storage is charged with electrical energy supplied from the fuel cell through a DC/DC converter. Further, the fuel cell system comprises at least one electrical device other than the energy storage, a detector for detecting a request for stopping power generation of the fuel cell, and a discharge electrical energy controller for controlling electrical energy discharged from the fuel cell. At the time of supplying electrical energy discharged from the fuel cell to the energy storage and the other electrical device after detection of the request for stopping power generation, the discharge electrical energy controller supplies the electrical energy preferentially to the other electrical device.

According to the present invention, after the detector detects the request for stopping power generation, at the time of supplying the discharge electrical energy to the energy storage and the other electrical device, the discharge electrical energy controller supplies the electrical energy preferentially to the other electrical device.

Thus, it is possible to reduce the discharge/charge losses in the energy storage. That is, in the technique, in comparison with a technique in which the entire discharge electrical energy is supplied to the energy storage, the energy efficiency is high.

In this case, when the output voltage of the fuel cell becomes equal to the voltage of the energy storage during the discharge process of the fuel cell, the discharge electrical energy controller may supply the electrical energy to the electrical device other than the energy storage only. Therefore, unlike the conventional technique, no function of increasing the voltage in the current supply direction from the fuel cell to the energy storage is required for the DC/DC converter. Thus, the DC/DC converter has a small scale (the DC/DC converter is compact, light, and produced at low cost).

The electrical energy discharged from the fuel cell is supplied preferentially to the other electrical devices including an air supplier which carries out the scavenging process in the fuel cell using the reactant gas. When electrical energy is discharged from the fuel cell, the scavenging process by the air supplier is performed in parallel with the discharge process of the fuel cell. Therefore, in comparison with the conventional technique in which the discharge process is carried out after the scavenging process, it is possible to reduce the charge/discharge losses in the energy storage, and losses by the DC/DC converter. Further, it is possible to reduce the time period from the time when the request for stopping power generation is received to the time when the fuel cell system is stopped.

In addition to the air supplier such as an air compressor, the other electrical device (the electrical device other than the energy storage) may include at least any one of a low voltage battery such as a 12V battery, a control device as an ECU, relay coils of contactors, and a load of a resistor.

It should be noted that if the discharge electrical energy controller controls the DC/DC converter such that the sum of the discharge electrical energy of the fuel cell and the discharge electrical energy of the energy storage becomes the sum of the electrical energy consumed by the air supply and the electrical energy consumed by the other electrical device, it is possible to reduce the losses by the DC/DC converter.

According to another aspect of the present invention, a method of controlling discharge electrical energy in a fuel cell system is provided. The fuel cell system comprises a fuel cell operated for power generation by reaction of reactant gases supplied to the fuel cell, an energy storage for assisting the output of the fuel cell. The energy storage is charged with electrical energy supplied from the fuel cell through a DC/DC converter. Further, the fuel cell system comprises at least one electrical device other than the energy storage. The method comprises the steps of detecting a request for stopping power generation of the fuel cell, and controlling electrical energy discharged from the fuel cell, after detection of the request for stopping power generation, such that, at the time of supplying electrical energy discharged from the fuel cell to the energy storage and the other electrical device, the electrical energy is supplied preferentially to the other electrical device.

According to the present invention, after the request for stopping power generation is detected, at the time of supplying the discharge electrical energy to the energy storage and the other electrical device, the electrical energy is supplied preferentially to the other electrical device.

Thus, it is possible to reduce the discharge/charge losses in the energy storage. That is, in the technique, in comparison with a technique in which the entire discharge electrical energy is supplied to the energy storage, the energy efficiency is high.

In this case, the controlling step of electrical energy discharged from the fuel cell may comprise supplying the electrical energy to the other electrical device only, when the output voltage of the fuel cell becomes equal to the voltage of the energy storage. Therefore, unlike the conventional technique, no function of increasing the voltage in the current supply direction from the fuel cell to the energy storage is required for the DC/DC converter. Thus, the DC/DC converter has a small scale (the DC/DC converter is compact, light, and produced at low cost).

The electrical energy discharged from the fuel cell may be supplied preferentially to the other electrical devices including an air supplier which carries out the scavenging process in the fuel cell using the reactant gas. When electrical energy is discharged from the fuel cell, the scavenging process by the air supplier may be preferably performed in parallel with the discharge process of the fuel cell. Therefore, in comparison with the conventional technique in which the discharge process is carried out after the scavenging process, it is possible to reduce the charge/discharge losses in the energy storage, and losses by the DC/DC converter. Further, it is possible to reduce the time period from the time when the request for stopping power generation is received to the time when the fuel cell system is stopped.

In addition to the air supplier such as an air compressor, the other electrical device (the device other than the energy storage) may include at least any one of a low voltage battery such as a 12V battery, a control device as an ECU, relay coils of contactors, and a load of a resistor.

It should be noted that if the controlling step of electrical energy discharged from the fuel cell comprises controlling the DC/DC converter such that the sum of the discharge electrical energy of the fuel cell and the discharge electrical energy of the energy storage becomes the sum of the electrical energy consumed by the air supply and the electrical energy consumed by the other electrical devices, it is possible to reduce the losses by the DC/DC converter.

According to the present invention, after the request for stopping power generation is detected, at the time of supplying the discharge electrical energy to the energy storage and the other electrical device, the electrical energy is supplied preferentially to the other electrical device. Thus, in the technique, in comparison with a technique in which the entire discharge electrical energy is supplied to the energy storage, the energy efficiency is high.

Further, according to the present invention, when the output voltage of the fuel cell becomes equal to the voltage of the energy storage during the discharge process of the fuel cell, electrical energy discharged from the fuel cell is supplied only to the electrical device other than the energy storage under control. Therefore, unlike the conventional technique, no function of increasing the voltage in the current supply direction from the fuel cell to the energy storage is required for the DC/DC converter. Thus, the DC/DC converter has a small scale (the DC/DC converter is compact, light, and produced at low cost).

Further, in comparison with the conventional technique in which the discharge process is carried out after the scavenging process, it is possible to reduce the charge/discharge losses in the energy storage, and losses by the DC/DC converter.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 8 is a time chart showing operation of the third embodiment;

FIG. 9A is a time chart showing a conventional discharge process; and

FIG. 9B is a time chart showing a discharge process according to an embodiment of the present invention.

DESCRIPTION OF THE PREFERRED EMBODIMENTS

Hereinafter, embodiments of the present invention will be described with reference to the accompanying drawings.

Figure 1:
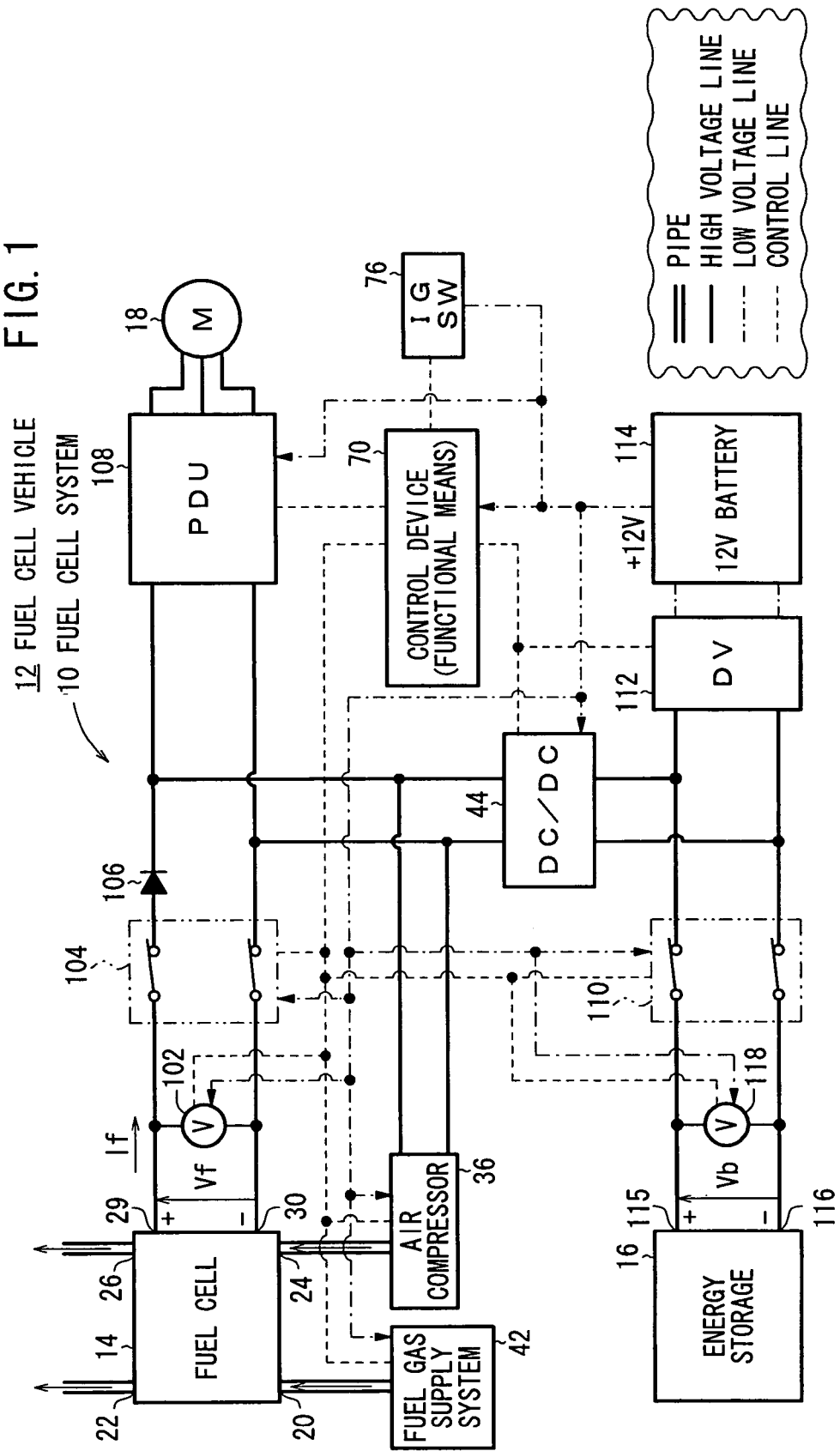
FIG. 1 is a diagram schematically showing structure of a fuel cell vehicle equipped with a fuel cell system according to a first embodiment of the present invention.

FIG. 1 is a diagram schematically showing structure of a fuel cell vehicle 12 including a fuel cell system 10 according to an embodiment of the present invention.

Basically, the fuel cell vehicle 12 includes a fuel cell 14, an energy storage 16, a motor 18, a fuel gas supply system 42, and an air compressor 36. The energy storage 16 is connected to the fuel cell 14 through a DC/DC converter 44, and assists the output of the fuel cell 14. The fuel cell 14 and the energy storage 16 drive the motor 18 for traveling of the vehicle 12. The fuel gas supply system 42 supplies a fuel gas to the fuel cell 14. The air compressor 36 supplies an oxygen-containing gas to the fuel cell 14. As the energy storage 16, a secondary battery such as a capacitor is used.

The fuel cell 14 has stack structure formed by stacking a plurality of cells each including an anode, a cathode, and a solid polymer electrolyte membrane interposed between the anode and the cathode.

The fuel cell 14 has a hydrogen supply port 20 for supplying a fuel gas such as a hydrogen ($H_2$) gas from the fuel gas supply system 42, a hydrogen discharge port 22 for discharging an exhaust gas from the fuel cell 14 (the exhaust gas contains the hydrogen gas which has not been consumed in the power generation), an air supply port 24 for supplying the air containing, e.g., the oxygen ($O_2$)-containing gas, and an air discharge port 26 for discharging the air containing unconsumed oxygen from the fuel cell 14. The air compressor 36 is an auxiliary device formed integrally with an air compressor motor for supplying the atmospheric air after compression. The air compressor 36 is driven by high voltage (terminal voltage Vf in FIG. 1).

A voltmeter 102 is connected between output terminals 29, 30 of the fuel cell 14 for measuring the terminal voltage Vf as the power generation voltage (also referred to as the discharge voltage at the time of discharging electrical energy).

The terminal voltage Vf between the output terminals 29, 30 of the fuel cell 14 is applied to a motor drive unit (PDU: Power Drive Unit) 108 for driving the motor 18 through a contactor (FC contactor) 104 for switching connection to or disconnection from the fuel cell 14, and a diode 106. Further, the terminal voltage Vf is applied to the high voltage side of the DC/DC converter 44 and the air compressor 36.

The energy storage 16 as a secondary battery for supplying electrical energy at high voltage in the order of several hundreds volts is connected to the low voltage side of the DC/DC converter 44 through a contactor (BAT contactor) 110 for switching connection to or disconnection from the energy storage 16. Further, a battery 114 for supplying electrical energy at low voltage of +12 volts is connected to the low voltage side of the DC/DC converter 44 through a downverter (DV) 112. The DC/DC converter 44 decreases the terminal voltage Vf on the fuel cell 14 side (including the PDU 108 side at the time of regeneration of the motor 18), and supplies electrical energy to the energy storage 16 and the DV 112 at the decreased voltage. Further, the DC/DC converter 44 increases the terminal voltage Vb of the energy storage 16, and supplies electrical energy to the PDU 108 and the air compressor 36 at the increased voltage. Since the DC/DC converter 44 does not has any function to increase the terminal voltage Vf to obtain the terminal voltage Vb, the DC/DC converter 44 has a small scale (the DC/DC converter 44 is compact, light, and produced at low cost).

A voltmeter 118 for measuring the terminal voltage Vb is connected between charge/discharge terminals 115, 116 of the energy storage 16.

Further, in the fuel cell system 10 and the fuel cell vehicle 12 equipped with the fuel cell system 10, a control device 70 is provided. The control device 70 controls the entire operation of the fuel cell system 10 and the fuel cell vehicle 12.

The control device 70 comprises a computer, and operates as means for achieving various functions by executing programs stored in a memory based on various inputs. In the embodiment, for example, the control device 70 is operated as a detector for detecting a power generation stop request (power generation stop request signal), a controller for controlling electrical energy discharged from the fuel cell 14 (discharge electrical energy controller), a detector for detecting voltage (voltage detector), a generator for generating a contactor switching signal (contactor switching signal generator), means for opening/closing, and controlling valve positions of various valves, calculator, and counter means (counter/timer).

Further, an ignition switch (IG switch; IGN) 76 is connected to the control device 70. The ignition switch 76 outputs a start-up signal (signal for starting operation) and a power generation stop request signal for the fuel cell vehicle 12 and the fuel cell system 10.

In FIG. 1, double lines denote pipes, solid lines denote high voltage lines (e.g., several hundreds volt), dashed-dotted lines denote low voltage (+12 volt in the embodiment) lines, and dotted lines denote signal lines such as a control line.

It can be seen from FIG. 1 that the voltage outputted from the 12V battery 114 through the low voltage lines indicated as the dashed-dotted lines is utilized in the CPU or the like of the control device 70, the electronic circuit of the DC/DC converter 44, relay coils of the FC contactor 104 and the BAT contactor 110, and solenoid valves of the fuel gas supply system 42, the electronic circuit of the air compressor 36, and the electronic circuits of the voltmeter 102 and the PDU 108.

During normal power generation operation of the fuel cell system 10, the valve control/contactor control of the control device 70 turns on (closes) the FC contactor 104 and the BAT contactor 110, supplies the air (oxygen) from the air compressor 36 to the cathode of the fuel cell 14, and supplies the hydrogen gas from the fuel gas supply system 42 to the anode of the fuel cell 14. Thus, hydrogen is ionized at the anode, and the hydrogen ions move to the cathode thorough the solid polymer electrolyte membrane. The electrons produced during the electrochemical reaction are collected as the power generation current If, and utilized in an external circuit.

Thus, during normal power generation of the fuel cell 14 by reaction of the reactant gases supplied to the fuel cell 14, the generated electrical energy If×Vf collected from the fuel cell 14 is supplied to the PDU 108 and the motor of the air compressor 36 through the FC contactor 104 and the diode 106, and if there is any redundant electrical energy, such electrical energy is supplied to the energy storage 16 through the DC/DC converter 44 and the BAT contactor 110 for charging the energy storage 16, and supplied to the 12V battery 114 through the DV 112 for charging the 12V battery 114. In practice, during power generation of the fuel cell 14, and at the time of stopping power generation as described later, while charging the 12V battery 114 through the DC/DC converter 44 and the DV 112, electrical energy of +12 V is supplied from the 12V battery 114 to respective components such as the control device 70.

As described above, under the control of the control device 70, the energy storage 16 is charged mainly by the voltage obtained by decreasing the terminal voltage Vf of the fuel cell 14 by the DC/DC converter 44. At the time of stopping power generation of the fuel cell 14, electrical energy stored in the energy storage 16 is supplied to the air compressor 36 as necessary, though not preferentially, and electrical energy is also supplied to a heater (not shown) used for warming the fuel cell 14 for next use at a low temperature such as a temperature below freezing, to assist the output of the fuel cell 14. It should be noted that when the driving force is transmitted from drive wheels to the motor 18 during deceleration of the fuel cell vehicle 12, the motor 18 functions as a power generator, and generates the so called regeneration braking force. Thus, kinetic energy of the vehicle body is collected as electrical energy. Further, the electrical energy from the motor 18 is regenerated (stored) in the energy storage 16 through the DC/DC converter 44.

Basic structure and operation of the fuel cell system 10 and the fuel cell vehicle 12 equipped with the fuel cell system 10 have been described above. Next, specific operation of the fuel cell system 10 and the fuel cell vehicle 12 at the time of stopping operation according to the first embodiment will be described with reference to a flow chart of FIG. 2 (program executed by the control device 70) and a time chart of FIG. 3.

In step S1, the above described normal power generation of the fuel cell 14 is performed. In step S2, it is determined whether the ignition switch 76 has been switched from the ON state to the OFF state.

In the determination of step S2, when it is confirmed that the ignition switch 76 is switched from the ON state to the OFF state (time t10), in step S3, the supply of the fuel gas from the fuel gas supply system 42 to the fuel cell 14 is stopped.

At the same time, in step S4, the control of electrical energy (discharge electrical energy) Pd discharged from the fuel cell 14 for supplying the discharge electrical energy Pd preferentially to electrical devices other than the energy storage 16 is started (the electrical devices other than the energy storage 16 are referred to as the other electrical devices). In the embodiment, the other electrical devices include the air compressor 36, the 12V battery 114 (electrical energy is supplied to the 12V battery 114 through the DC/DC converter 44 and the DV 112), the control device 70 (electrical energy at +12 [V] from the 12V battery 114 is supplied to the control device 70), the relay coils of the FC contactor 104 and the BAT contactor 110, the electronic circuits of the voltmeters 102, 118, and the solenoid valves of the fuel gas supply system 42 and the air compressor 36.

Figure 3:
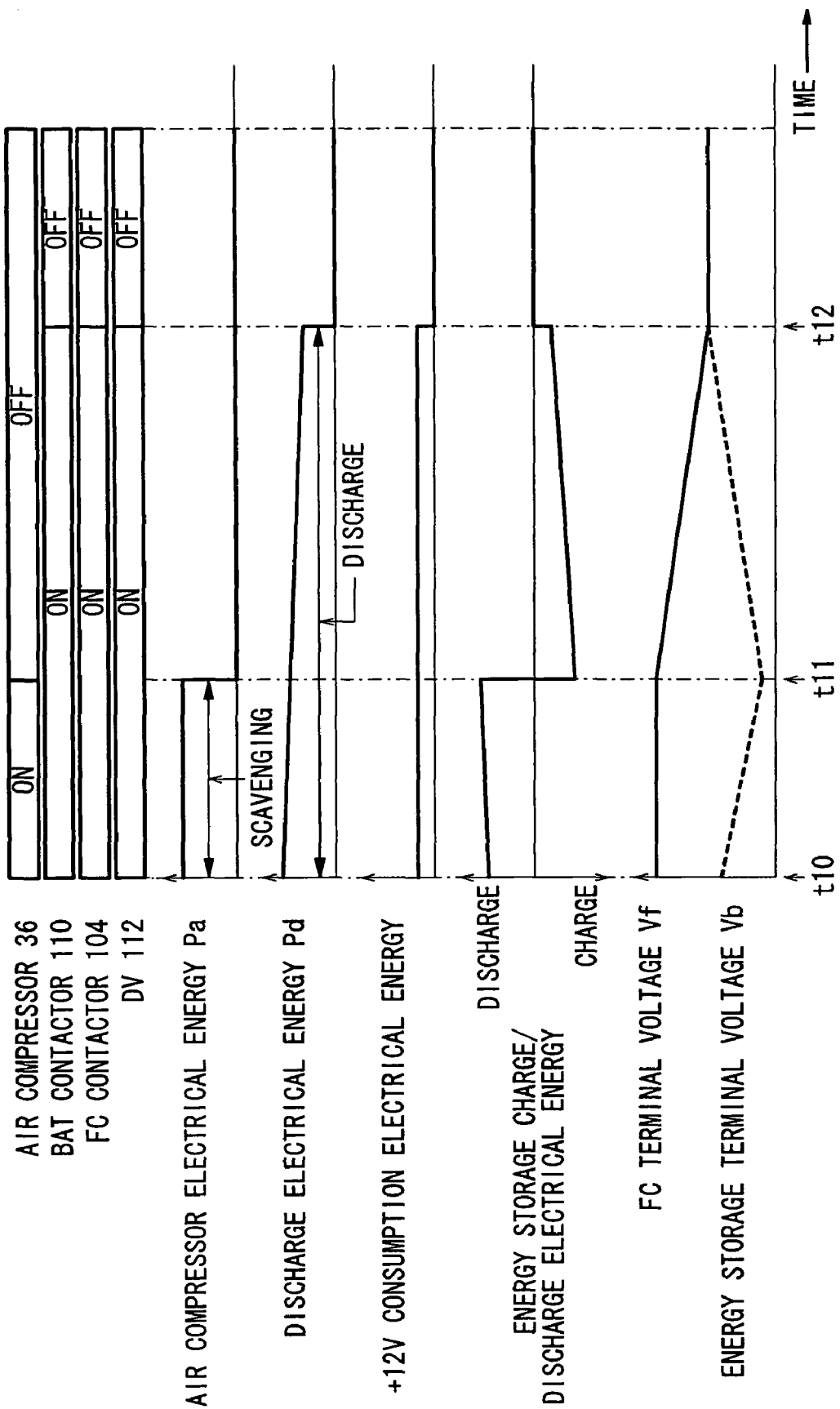
FIG. 3 is a time chart showing operation of the first embodiment.

In the time chart of FIG. 3, the ignition switch 76 is switched from the ON state to the OFF state at the time t10. Before and at the time t10, the air compressor 36, the BAT contactor 110, the FC contactor 104, and the DV 112 are kept in operation (ON state).

Thus, electrical energy supplied to the air compressor 36 (air compressor electrical energy) is consumed for power generation before the time t10, and consumed for the cathode scavenging process of the fuel cell 14 in a period from the time t10 to the time t11.

The discharge electrical energy Pd in FIG. 3 is produced in the reaction of the remaining hydrogen gas and the oxygen-containing gas in the fuel cell 14, and the discharge electrical energy is gradually reduced over time from the time t10 due to consumption of the remaining hydrogen gas.

Consumption of the electrical energy of +12V does not stop at the time t10, and continues.

The term "energy storage charge/discharge electrical energy" means electrical energy outputted (discharged) from the energy storage 16, and supplied (charged) to the energy storage 16. In the example of the time chart in FIG. 3, electrical energy is discharged from the time t10 when the power generation stop request is detected for driving the air compressor 36. From the time t10 to time t11, electrical energy for the air compressor Pa is obtained by the sum of electrical energy discharged from the energy storage 16 and the discharge electrical energy Pd discharged from the fuel cell 14.

The FC terminal voltage Vf is the output voltage of the fuel cell 14, and the FC terminal voltage Vf does not change significantly from the time t10 to the time t11. The FC terminal voltage Vf starts to be decreased gradually from the time t11. The energy storage terminal voltage Vb means the output voltage of the energy storage 16 which is decreased gradually from the time t10 to the time t11 due to the discharge of electrical energy.

Then, in step S5, it is determined whether the cathode scavenging process of the fuel cell 14 has been finished or not.

In the cathode scavenging process, as described above, electrical energy is supplied to the air compressor 36, and water produced in the power generation is removed from the cathode. For example, the determination as to whether the cathode scavenging process has been finished or not is made by detecting the change in the pressure of a pressure gauge (not shown) at the air discharge port 26, or time management.

If the cathode scavenging process has not been finished, in step S6, operation of driving the air compressor 36 continues.

Then, in step S7, it is determined whether the discharge process of the fuel cell 14 has been finished or not. The determination as to whether the discharge process of the fuel cell 14 has been finished or not is made by determining whether the terminal voltage Vf of the fuel cell 14 has a predetermined value or less, specifically, in the example of FIG. 3, whether the terminal voltage Vf of the fuel cell 14 has become equal to the terminal voltage Vb of the energy storage 16. In this manner, the cathode scavenging process of the fuel cell 14 and the discharge process of the fuel cell 14 are carried out at the same time.

If the discharge process has not been finished, in step S8, it is determined whether the discharge electrical energy Pd is larger than the air compressor electrical energy Pa or not.

If the discharge electrical energy Pd is larger than the air compressor electrical energy Pa, in step S9, the DC/DC converter 44 is placed in the step down mode, and some of the discharge electrical energy Pd is charged in the energy storage 16 through the BAT contactor 110. If the discharge electrical energy Pd is smaller than the air compressor electrical energy Pa, in step S10, the DC/DC converter 44 is placed in the step up mode. The output voltage Vb of the energy storage 16 is increased, and electrical energy is supplied to the fuel cell 14 side for assisting operation of driving the air compressor 36 by the electrical energy of the energy storage 16 (see time t10 to time t11).

In the determination of step S7, if the discharge electrical energy Pd cannot be obtained, stated otherwise, if the discharge process has been finished, in step S11 corresponding to the time t12, the FC contactor 104 is placed in the OFF state, and the DC/DC converter 44 is placed in the step up mode. If the cathode scavenging process of the fuel cell 14 in step S5 has not been finished, the cathode scavenging process continues only using the electrical energy of the energy storage 16 (the process is not shown in the time chart of FIG. 3).

In step S5, if it is determined that the cathode scavenging process has been finished, in step S12, the air compressor 36 is stopped, and placed in the OFF state (time t11).

Then, in step S13, it is determined whether the discharge process has been finished or not. If the discharge electrical energy Pd is remaining, in step S14, the DC/DC converter 44 is placed in the step down mode, and the energy storage 16 is charged with the discharge electrical energy Pd of the fuel cell 14 (after the time t11).

In step S13, when the terminal voltage Vf of the fuel cell 14 becomes equal to the terminal voltage Vb of the energy storage 16 at the time t12, it is determined that the discharge process has been finished. In step S15, the FC contactor 104 is placed in the OFF state, and operation of the DC/DC converter 44 is stopped.

Then, in step S16, the BAT contactor 110 is placed in the OFF state, and the control of electrical energy discharged from the fuel cell 14 is finished (time t12). After the time t12, the system operation of the fuel cell system 10 is stopped.

Figure 4:
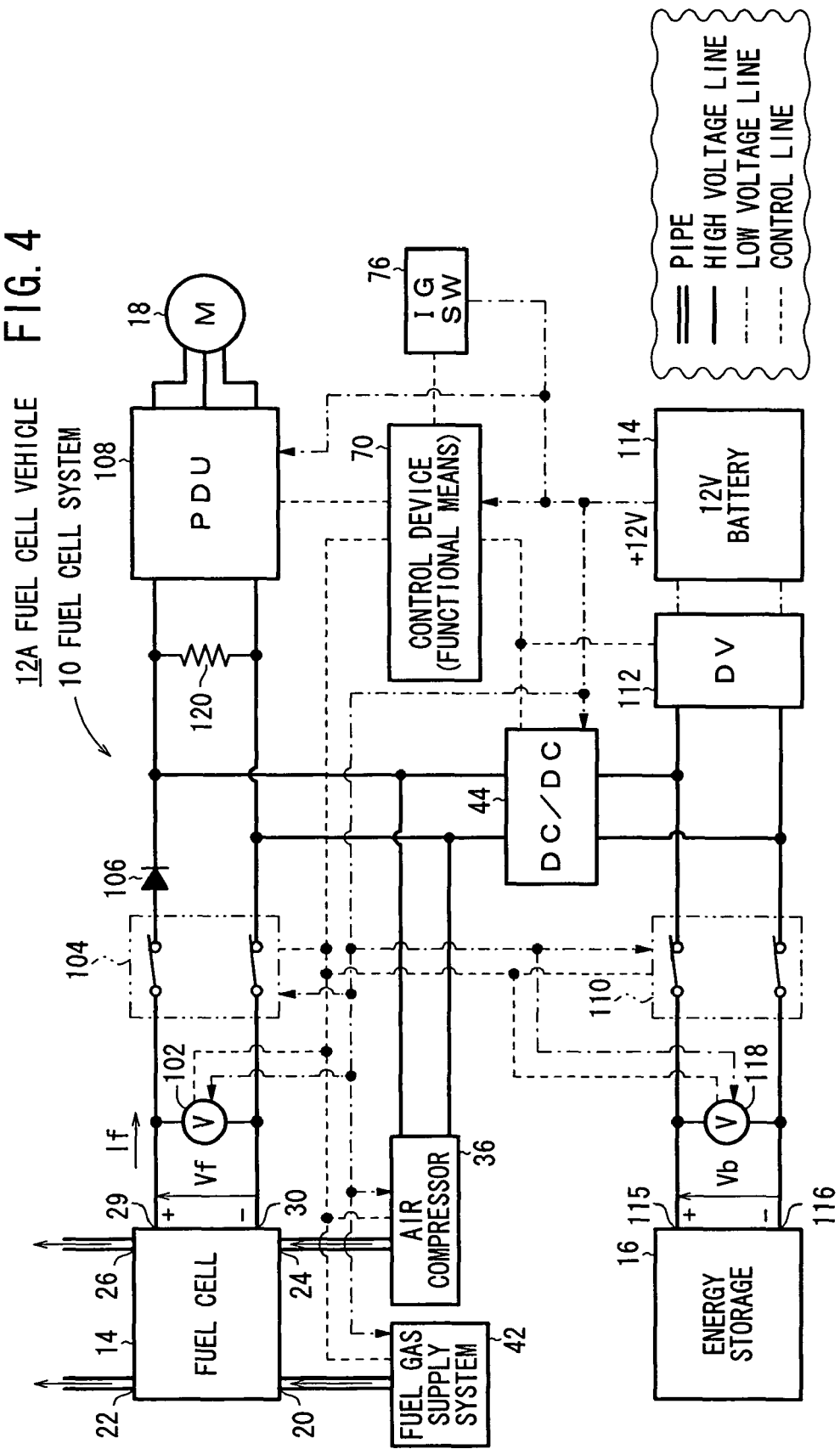
FIG. 4 is a diagram schematically showing structure of a fuel cell vehicle equipped with a fuel cell system according to second and third embodiments of the present invention.

In practice, the fuel cell vehicle 12 may have structure of a fuel cell vehicle 12A as shown in FIG. 4 according to a second embodiment. In the fuel cell vehicle 12A, in addition to the air compressor 36 and the DC/DC converter 44, a resistor 120 for discharging electrical energy of a PDU capacitor (not shown) is connected in parallel as a load between the high voltage lines.

Figure 2:
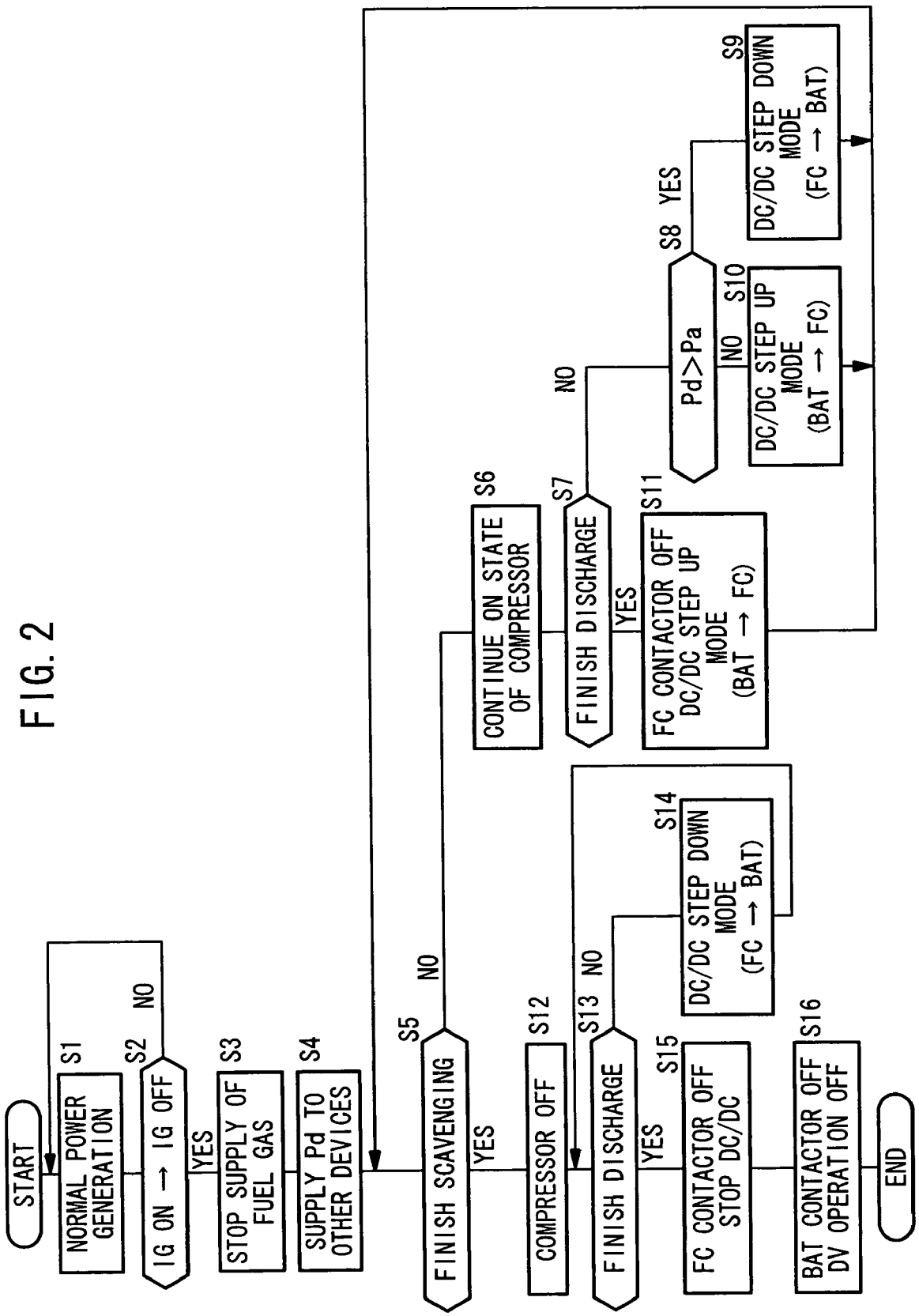
FIG. 2 is a flow chart showing operation of the first embodiment.
Figure 5:
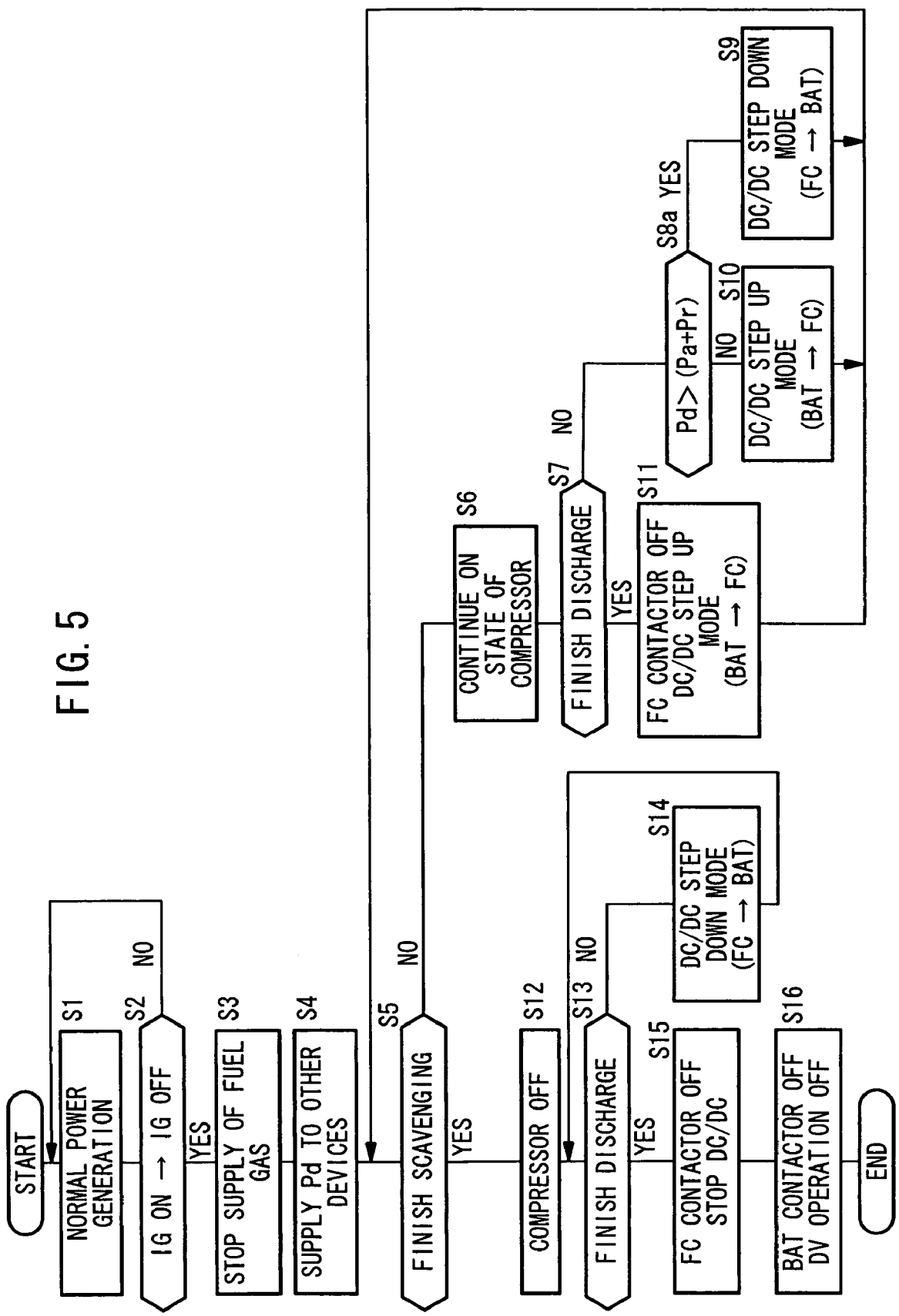
FIG. 5 is a flow chart showing operation of the second embodiment.

In the second embodiment, as shown in FIG. 5, the operation of step S8 in FIG. 2 is replaced with operation of step S8*a*.

Figure 6:
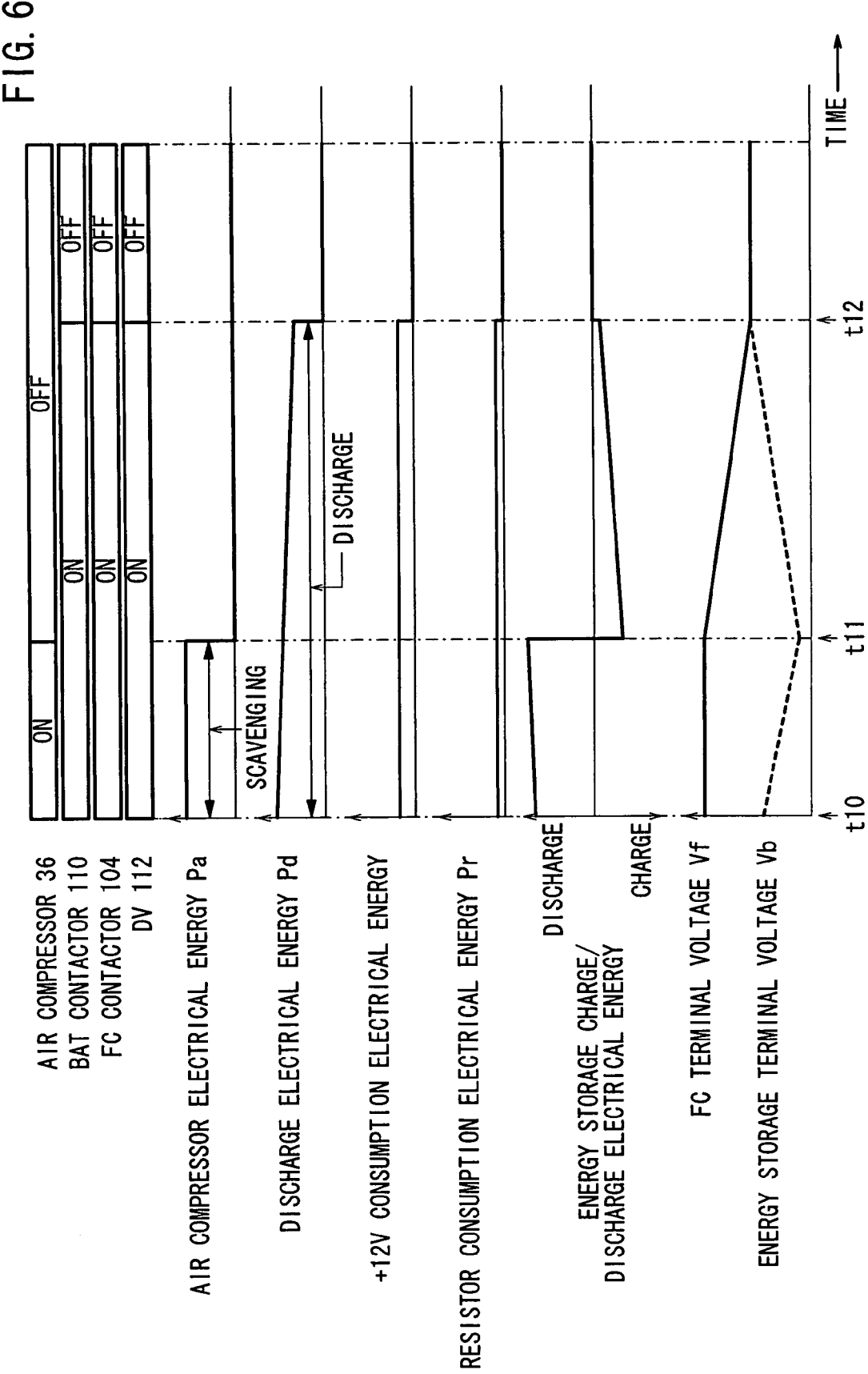
FIG. 6 is a time chart showing operation of the second embodiment.

Further, compared with the time chart shown in FIG. 3, a time chart shown in FIG. 6 includes a waveform of the resistor consumption electrical energy Pr is added between the waveform of the +12V consumption electrical energy and the waveform of the energy storage charge/discharge electrical energy, and the waveform of the energy storage charge/discharge electrical energy is shifted to the discharge side between the time t10 and the time t12, by the amount corresponding to the resistor consumption electrical energy Pr.

That is, in FIG. 5, if the discharge process in step S7 has not been finished, in step S8*a*, it is determined whether the discharge electrical energy Pd is larger than the electrical energy sum (Pa+Pr) of the air compressor electrical energy Pa and the electrical energy Pr of the resistor 120 (Pd>(Pa+Pr)).

If the discharge electrical energy Pd is larger than the electrical energy sum (Pa+Pr), in step S9, the DC/DC converter 44 is placed in the step down mode, and some of the discharge electrical energy Pd is charged in the energy storage 16 through the BAT contactor 110. If the discharge electrical energy Pd is smaller than the electrical energy sum (Pa+Pr), in step S10, the DC/DC converter 44 is placed in the step up mode. The output voltage Vb of the energy storage 16 is increased, and electrical energy is supplied to the fuel cell 14 side, for assisting operation of driving the air compressor 36 by the electrical energy of the energy storage 16 (see the time t10 to the time t11).

Figure 7:
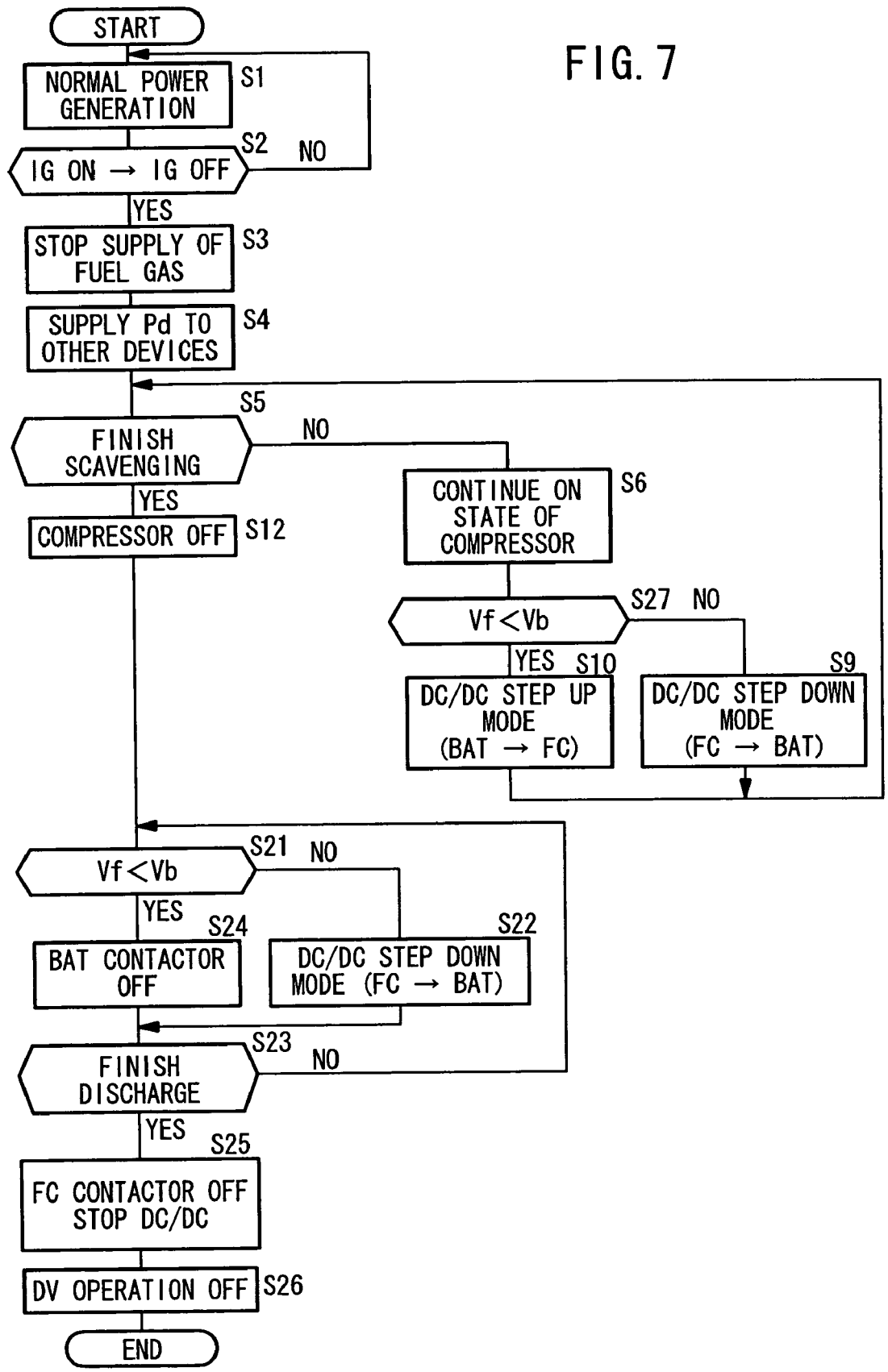
FIG. 7 is a flow chart showing operation of the third embodiment.

Next, FIGS. 7 and 8 show a flow chart and a time chart according to a third embodiment of the present invention applied to the fuel cell vehicle 12A having the load of the resistor 120 in FIG. 4.

In the third embodiment, in the fuel cell vehicle 12A shown in FIG. 4, during the discharge process, in step S21, if the terminal voltage Vf of the fuel cell 14 becomes lower than the terminal voltage Vb of the energy storage 16 (see the time t12 in FIG. 8), in step S24, the BAT contactor 110 is placed into the OFF state (see the time t12 in FIG. 8), and in step S23, if the discharge process has not been finished, in step S22, the DC/DC converter 44 is placed into the step down mode, and the discharge electrical energy Pd is consumed through the DV 112 and the 12V battery 114, and the discharge electrical energy Pd is consumed by the resistor 120 to continue the discharge process.

When the terminal voltage Vf of the fuel cell 14 becomes a predetermined low voltage which is lower than the terminal voltage Vb of the energy storage 16, the determination of step S23 becomes affirmative (YES), and the discharge process is finished.

Then, in step S25, the FC contactor 104 is placed in the OFF state, and operation of the DC/DC converter 44 is finished (time t13 of FIG. 8). Further, in step S26, operation of the DV 112 is finished, and the process of controlling electrical energy discharged from the fuel cell 14 is finished.

In the third embodiment, in the period in which the cathode scavenging process in step S5 continues, the voltage required for driving the air compressor 36 to continue operation of the air compressor 36 in step S6 needs to be high.

Therefore, while the cathode scavenging process continues (No in step S5), in step S27, even if the terminal voltage Vf of the fuel cell 14 becomes lower than the terminal voltage Vb of the energy storage Vb, in step S10, the DC/DC converter 44 is placed in the step up mode for increasing the terminal voltage Vb of the energy storage 16 by the DC/DC converter 44. Until the cathode scavenging process in step S5 is finished, operation of the air compressor 36 continues. During the operation, the discharge process is interrupted.

In step S27, if the terminal voltage Vf of the fuel cell 14 is higher than the terminal voltage Vb of the energy storage 16, in step S9, the DC/DC converter 44 is placed in the step down mode, and the charge process for the energy storage 16 and the discharge process for the fuel cell 14 is carried out in parallel.

As described above, in the first to third embodiments, after the request for stopping power generation is detected, at the time of supplying the discharge electrical energy Pd to the energy storage 16 and the other electrical devices such as the air compressor 36, the electrical energy is supplied preferentially to the other electrical devices such as the air compressor 36. Thus, it is possible to reduce the discharge/charge losses in the energy storage 16 at the time of discharging electrical energy from the fuel cell 14. That is, in the technique, in comparison with a technique in which the entire discharge electrical energy Pd is supplied to the energy storage 16, the energy efficiency is high.

Further, in the first and second embodiments, when the terminal voltage Vf of the fuel cell 14 becomes equal to the terminal voltage Vb of the energy storage 16 during the discharge process of the fuel cell 14, the discharge electrical energy Pd of the fuel cell 14 is supplied only to the electrical devices other than the energy storage 16. Therefore, unlike the conventional technique, no function of increasing the voltage in the current supply direction from the fuel cell 14 to the energy storage 16 is required for the DC/DC converter 44. Thus, the DC/DC converter 44 has a small scale (the DC/DC converter 44 is compact, light, and produced at low cost).

The discharge electrical energy Pd is supplied preferentially to the other electrical devices including at least the air compressor 36 as an air supply which carries out the scavenging process in the fuel cell 14 using the reactant gas. When electrical energy is discharged from the fuel cell 14, the scavenging process by the air compressor 36 is performed in parallel with the discharge process of the fuel cell 14. Therefore, in comparison with the conventional technique in which the discharge process is carried out after the scavenging process, it is possible to reduce the charge/discharge losses in the energy storage 16, and losses by the DC/DC converter 44. Further, it is possible to reduce the time period from the time when the request for stopping power generation is received to the time when the fuel cell system 10 is stopped.

In addition to the air compressor 36, the other electrical devices (the devices other than the energy storage 16) include at least any one of the 12V battery 114, the control device 70 as an ECU, the relay coils of the FC contactor 104 and the BAT contactor 110, and the load of the resistor 120.

It should be noted that since the DC/DC converter 44 is controlled such that the sum of the discharge electrical energy Pd of the fuel cell 14 and the discharge electrical energy of the energy storage 16 becomes the sum of the electrical energy consumed by the air compressor 36 and the electrical energy consumed by the other electrical devices, it is possible to reduce the losses by the DC/DC converter 44.

Next, an example of operation and advantages of the embodiments will be described with reference to a time chart of FIG. 9B. At the time t0, when the supply of the fuel gas to the fuel cell 14 is stopped, firstly, all (in the case of FIG. 9B) or some of the electrical energy P6 required for the cathode scavenging process is supplied by the discharge electrical energy P8 from the fuel cell 14. Thereafter, by charging the energy storage 16 using the remaining electrical energy P8, at the time t1, in comparison with the conventional discharge process shown in FIG. 9A, the process is finished in a short period of time (a period from the time t0 to the time t2 is shortened to a period from the time t0 to the time t1). Before charging the energy storage 16, since the charge/discharge losses and the DC/DC converter loss P7 occur only once, in comparison with the case of using the energy storage electrical energy P3 in the conventional technique, the extra electrical energy in the amount of the loss P10 can be used for charging, and the larger energy storage electrical energy P4 can be obtained when the system is stopped.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell system comprising:
   a fuel cell operated for power generation by reaction of reactant gases supplied to said fuel cell;
   an energy storage for assisting the output of said fuel cell, said energy storage being charged with electrical energy supplied from said fuel cell through a DC/DC converter;
   at least one electrical device other than said energy storage;
   a detector for detecting a request for stopping power generation of said fuel cell; and
   a discharge electrical energy controller for controlling electrical energy discharged from said fuel cell, wherein at the time of supplying electrical energy discharged from said fuel cell to said energy storage and the other electrical device after detection of the request for stopping power generation, said discharge electrical energy controller supplies the electrical energy preferentially to the electrical device other than the energy storage,
   wherein if the preferentially supplied energy, on receipt of the request by the detector, is greater than the energy consumed by the electrical device, the remaining energy is supplied to the energy storage.

2. A fuel cell system according to claim 1, wherein said discharge electrical energy controller supplies the electrical energy discharged from the fuel cell to the other electrical device only, when the output voltage of the fuel cell becomes equal to the voltage of said energy storage.

3. A fuel cell system according to claim 1, wherein one of the other electrical devices includes an air supplier for supplying the air for performing a scavenging process of the reactant gases in said fuel cell; and
   at the time of discharging electrical energy from said fuel cell, said discharge electrical energy controller controls the process of discharging electrical energy from said fuel cell to be performed in parallel with the scavenging process by the air supplier.

4. A fuel cell system according to claim 3, wherein said discharge electrical energy controller controls said DC/DC converter such that the sum of electrical energy discharged from said fuel cell and electrical energy discharged from said energy storage becomes equal to the sum of electrical energy consumed by said air supplier and electrical energy consumed by the other electrical device.

5. A method of controlling discharge electrical energy in a fuel cell system, said fuel cell system comprising:

a fuel cell operated for power generation by reaction of reactant gases supplied to said fuel cell;

an energy storage for assisting the output of said fuel cell, said energy storage being charged with electrical energy supplied from said fuel cell through a DC/DC converter; and at least one electrical device other than said energy storage, said method comprising the steps of:

detecting a request for stopping power generation of said fuel cell; and controlling electrical energy discharged from said fuel cell, after detection of the request for stopping power generation, such that, at the time of supplying electrical energy discharged from said fuel cell to said energy storage and the other electrical device, the electrical energy is supplied preferentially to the electrical device other than the energy storage, wherein if the preferentially supplied energy, on detecting the request, is greater than the energy consumed by the electrical device, the remaining energy is supplied to the energy storage.

6. A method according to claim 5, wherein said controlling step of electrical energy discharged from the fuel cell comprises supplying the electrical energy to the other electrical device only, when the output voltage of said fuel cell becomes equal to the voltage of said energy storage.

7. A method according to claim 5, wherein one of the other electrical devices includes an air supplier for supplying the air for performing a scavenging process of the reactant gases in said fuel cell; and said controlling step of electrical energy discharged from said fuel cell comprises controlling the process of discharging electrical energy from said fuel cell to be performed in parallel with the scavenging process by the air supplier.

8. A method according to claim 7, wherein said controlling step of electrical energy discharged from the fuel cell comprises controlling said DC/DC converter such that the sum of electrical energy discharged from said fuel cell and electrical energy discharged from said energy storage becomes equal to the sum of electrical energy consumed by said air supplier and electrical energy consumed by the other electrical device.

* * * * *